United States Patent
Weber et al.

[15] 3,660,821

[45] May 2, 1972

[54] DISC FILE AGC CIRCUIT

[72] Inventors: Gunter R. Weber, Newbury Park; Charles E. Bickel, Thousand Oaks; Richard W. Krueger, Oxnard, all of Calif.

[73] Assignee: Burroughs Corporation, Detroit, Mich.

[22] Filed: June 17, 1970

[21] Appl. No.: 46,912

[52] U.S. Cl. ....................................................340/174.1 H

[51] Int. Cl. ....................................G11b 5/02, G11b 5/44

[58] Field of Search ..............340/174.1 B, 174.1 H, 174.1 C; 179/100.2 S

[56] References Cited

UNITED STATES PATENTS

| | | | |
|---|---|---|---|
| 3,181,133 | 4/1965 | Seitner | 340/174.1 H |
| 3,252,099 | 5/1966 | Dodd | 340/174.1 H |
| 3,271,526 | 9/1966 | Cochran et al. | 340/174.1 H |
| 3,430,215 | 2/1969 | Krossa et al. | 340/174.1 H |
| 3,516,066 | 6/1970 | Jacoby | 340/174.1 H |

*Primary Examiner*—Bernard Konick
*Assistant Examiner*—Vincent P. Canney
*Attorney*—Christie, Parker & Hale

[57] ABSTRACT

In a storage system having a moving magnetic recording surface, a method and apparatus for providing constant amplitude readback information data, regardless of the initial amplitude of the information data when read from the magnetic recording surface, utilizes an AGC feedback loop between a readback amplifier's output and input. Preamble data, preceding each recorded segment of information data is sampled and a signal indicative of the peak value thereof is fed into the amplifier. The amplifier output signal is compared with a reference signal representing the desired peak value of the information data readback. As long as a difference is detected, a signal is generated to vary the amplifier gain until it reaches a value wherein the difference is eliminated. Once the difference is eliminated, the gain is maintained at that value so as to insure constant information data readback amplitude for the segment of information data.

16 Claims, 5 Drawing Figures

INVENTORS.
GUNTER R. WEBER
CHARLES E. BICKLE
RICHARD W. KRUEGER

BY Christie, Parker & Hale
ATTORNEYS

DISC FILE AGC CIRCUIT

BACKGROUND OF THE INVENTION

1. Field of the Invention

This invention relates to storage apparatus having a moving magnetic recording surface and more specifically to a method and apparatus for the discrimination of information data signals from noise when reading back such signals from a magnetic recording surface.

2. Description of the Prior Art

When reading information data stored on a magnetic recording surface, such as a disc, there is an anticipated amount of noise and thus an expected signal to noise (S/N) ratio.

In certain disc file systems, a threshold level (T) is arbitrarily established at a value slightly greater than the anticipated noise, but less than the expected peak value of the information data signals to be read from a disc. Such systems include a form of amplitude discrimination in order to detect only signals exceeding the threshold level, i.e. only information data signals. In this manner, noise is effectively discriminated against.

In a disc file system, various factors influence the amplitude of data signals read back from any particular disc. Some of these factors include: variations in the characteristics of the electromagnetic read heads; variations in the so-called "flying-height" between each read head and the disc; variations in the location of data stored on the disc; and other extraneous conditions.

In some disc file systems, the expected variation of signals due to the above factors is relatively low, i.e. 5 to 1, but in others is much higher, i.e. 13 to 1. A problem is inherent in the use of a constant threshold value (T) in a system where the amplitude of information data signals are subject to variation. It is forseeable that a data signal of amplitude lower than T could exist thereby inhibiting its detection, i.e. it would be discriminated against as noise.

In the past, various methods have been employed to solve the above problem. These methods are primarily manifest, however, only in disc file systems having a relative low data signal variation (5 to 1).

One method involves varying the gain of the readback amplifier by setting it at either of two gain levels. This method, although reducing the possibility of a data signal being discriminated against as noise does not eliminate the problem, since the amplifier output signal is still subject to variations at each gain setting responsive to variations in the amplitude of the information data read from the disc. Since the threshold level T remains constant in this method, possibilities are still present for certain information data signals to be of such an amplitude, at any one of the two gain settings, to be discriminated against as noise.

Realizing the limitations inherent in the above method, a method was developed for varying the threshold level T responsive to and corresponding with variations in the amplitude of information data read from the disc. In this way, the difference between the threshold level and data signals remained substantially constant thereby maintaining a constant signal to threshold (S/T) ratio. The above method of T variation is more fully and completely described in co-pending application, Ser. No. 779,802, filed on Nov. 29, 1968 by Charles E. Bickel and owned by the assignee of the present invention, which matured into U.S. Pat. No. 3,593,334 on July 13, 1971.

The above two methods of noise discrimination were employed primarily in disc file systems having a relatively low data signal variation, e.g. approximately 5 to 1. These methods, when attempted to be used with systems having a much greater signal variation, e.g. 13 to 1, proved inefficient and generally unsuccessful because of the hardware circuit limitations.

According to a third method known in the prior art, automatic gain control (AGC) continuously adjusts the gain of the readback amplifier while the information data is being read to maintain the amplifier output constant. Of necessity, the AGC has a relatively slow response time, i.e., 60 to 120 us, to render it insensitive to the information pulse pattern. This slow response time imposes a limitation on the signal variation, i.e., about 8 to 1, that the AGC is able to accommodate.

SUMMARY OF THE INVENTION

The method and apparatus according to the present invention represents a substantial improvement over the third method above described but is equally applicable to any storage system utilizing a moving magnetic recording surface (such as a disc, drum or tape). The invention, however, finds its greatest utility in disc file systems. In such systems, the invention achieves a desired output signal to threshold level ratio regardless of the readback signal variations inherent therein and in an extremely fast period of time, i.e. 500 ns. In addition, the invention can be used with disc file systems having a signal variation substantially greater than 5 or 8 to 1, e.g. 13 to 1 or higher and still retain the fast time in which to establish a constant signal to threshold level ratio. This is accomplished by using intermittent AGC.

The method and apparatus utilize the fact that recorded with and preceding each segment of information data is a series of data bits called a preamble. The preamble is used to identify each segment of recorded information data. Since the same head reads both the preamble and the following segment of information data, the amplitude of the preamble signal is the same as the following information data. This is so since the various factors heretofore mentioned, as causing signal variations, are not present when the same head is used to read the preamble and information.

According to the present invention, the AGC is activated during the preamble to establish a gain level and is deactivated during the information data to process the information data at such gain level. A method based on the inventive concept involves the steps of: sampling the amplitude of the preamble data signal preceding each segment of information data signals read from the recording surface; providing a first signal representative of the peak value of the sample preamble data signal; amplifying the first signal to produce a second signal; providing a reference signal indicative of a desired peak value for information data signals to be read from the surface; comparing the second signal with the reference signal, and providing a third signal indicative of a difference between the second and reference signals; and controlling the gain, in the step of amplifying, with the third signal until a predetermined relation is established between the reference and third signal, and maintaining the gain at the value at which the predetermined relation is established while the information data of the segment is read.

This method insures that a constant amplitude information data signal will always appear at the amplifier output regardless of the segment of data read and regardless of variations in heads used and their respective flying-heights, if different. According to the method, each time a new segment of information data is to be read from the disc, the preamble, recorded in such segment, is sampled to eventually control the amplifier gain to maintain the information data signals read back at a constant value, such value being related to the reference signal. In a preferred embodiment the relationship is equality.

An apparatus, according to the present invention, used to achieve a constant signal to threshold level ratio in a very fast time period, as above described, comprises: first means for sampling the amplitude of a preamble data signal preceding each segment of information data signals read from the recording surface and for producing a first signal proportional to the amplitude thereof; controllable amplifier means for amplifying the first signal and information data signals for forming a second signal; second means for producing a third signal indicative of a desired peak value for all information data signals to be read from the recording surface; third means for comparing the second and third signals and, during the time a preamble data signal is being amplified, for varying the gain of the controllable amplifier means until a predetermined relation is established between the second and third signals; and fourth means for maintaining the gain of the amplifying means at the value established when the predetermined relation is established during the time information data signals are being read.

BRIEF DESCRIPTION OF THE DRAWING

These and other aspects and advantages of the present invention are more clearly and distinctly described below with reference to the drawing, in which.

DESCRIPTION OF THE PREFERRED EMBODIMENT

A disc file system generally comprises a plurality of m magnetic recording discs, each having various forms of data recorded thereon in various locations. Thus, information data are usually recorded on the disc in segments, each segment being located on a different track and each track being located in a different zone on the disc.

Figure 1:
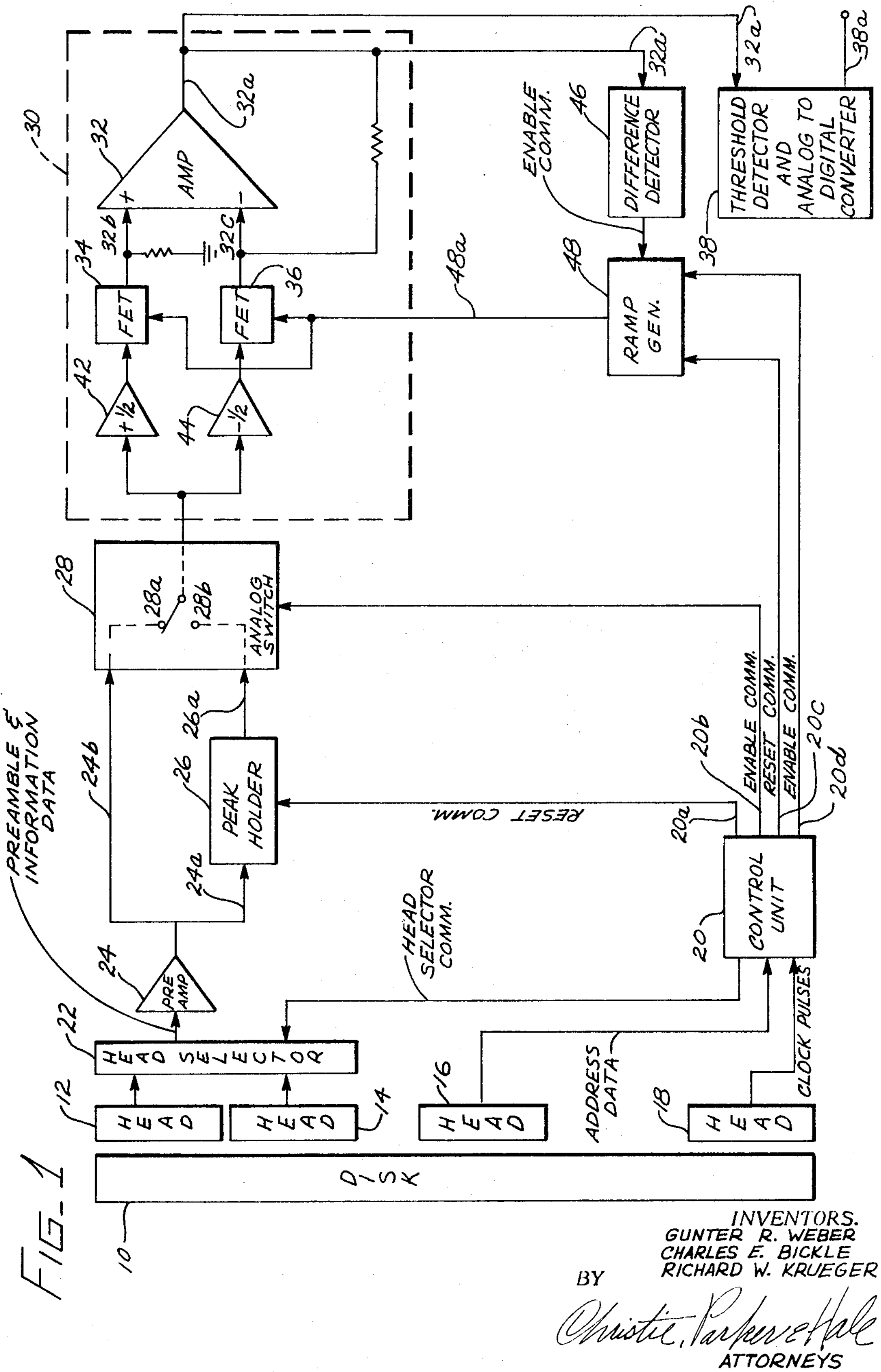
FIG. 1 is a block diagram representation of the preferred embodiment of the invention.

FIG. 1 shows a single magnetic recording disc 10 having associated electromagnetic heads 12 and 14, each for reading numerous segments of information data stored on a track located in a particular zone on the disc. In reality, many heads are associated with each disc, some of which are for reading or writing information data, and some of which are for reading address data and clock pulses stored on the disc. Heads 16 and 18 are shown to indicate an address read head and a clock read head, respectively.

A control unit 20 is shown in FIG. 1 for receiving address data read by head 16, and clock pulses read by head 18. Control unit 20 additionally initiates a head selector command for receipt by a head selector circuit 22. If information data is desired to be read from a track associated with head 12, for example, control unit 20 initiates a head selector command causing the information read by head 12 to be fed to a pre-amplifier 24 where the data signals are initially amplified.

According to the present invention, the output of pre-amplifier 24 is fed to two places: (1) the input of a peak holder 26; and (2) the input of an analog switch 28.

The purpose of the invention, as heretofore stated, is to maintain constant the amplitude of information data signals read from the disc regardless of the segment of data being read, the head reading such data, or variations in the flying-height of the head, etc. The reason is to maintain a substantially constant S/T ratio for the system. With the above in mind, the invention makes use of the fact that preamble data precede the information data recorded on each segment and that such preamble, since read by the same head as the following information data, has substantially the same amplitude characteristics as the information data of such segment.

Therefore, if head 12 is selected by selector circuit 22 responsive to a command from control unit 20, and starts to read information data from a segment on a track, it will first read the preamble which will have the same amplitude as the following information. The preamble is amplified by pre-amplifier 24 and is simultaneously sensed by control unit 20 because of its receipt of address data from head 16 corresponding to the segment of information data being read by head 12. Responsive to sensing the preamble, control unit 20 sends out a command signal to peak holder 26 causing it to reset. Another signal is sent out to analog switch 28 causing it to switch from position contact 28*a* to position contact 28*b*. A circuit path is thereby established from pre-amplifier 24 through peak holder 26 and through analog switch 28.

The established circuit path causes the preamble to pass into peak holder 26 where it is sampled and the peak value thereof detected and stored. A signal indicative of the peak value is then fed through analog switch 28 to an amplifier circuit 30.

Amplifier circuit 30 consists of an operational amplifier 32 used in a differential mode and hereinafter referred to as a differential amplifier having an output 32*a* which is the output of the amplifier circuit 30. The output 32*a* from circuit 30 is maintained at a constant predetermined value which is the desired value of all information data signals to be read from the disc, regardless of the segment thereof.

Differential amplifier 32 has two inputs 32*b* and 32*c* respectively coupled to a pair of field-effect transistors (FET's) 34 and 36. The field effect transistors operate as voltage-variable resistances. Thus, the voltage supplied thereto controls their effective resistance. This is important since the FET's 34 and 36 have the effect of controlling the overall gain of amplifier circuit 30, i.e. the gain being varied by varying the effective resistance of the FET's.

In the preferred embodiment of the invention, the desired output from amplifier circuit 30 is 1 volt peak to peak (1Vpp). This value is desirable in order to effectively digitize the information data signals read from the disc. As hereinafter discussed in detail, a threshold detector and analog to digital converter 38 is coupled to the output 32*a* of circuit 30 in order to discriminate against noise and to digitize the information data signals.

The 1Vpp output amplitude is the desirable value of information data regardless of the actual variability of information data as read from the disc due to factors such as variations in heads, flying-height, etc. This invention concerns itself with a method and means for achieving a constant signal output, such as 1Vpp, for example.

Returning to the circuit of FIG. 1, FET's 34 and 36 are coupled to analog switch 28 by means of a pair of amplifiers 42 and 44, respectively. These amplifiers are significant as being inputs to the FET's because of the desirable 1Vpp output from amplifier circuit 30. The amplifiers 42 its 44 are each chosen with a fractional gain of 0.5. The reason for i.e. latter is that most FET's cannot operate linearly with more than a 0.5 volt peak to peak (0.5 Vpp) drain to source.

Amplifiers 42 and 44 insure linear operation of the FET's and, at the same time, provide a 1Vpp output from differential amplifier 32. This is done having in mind the differential characteristics inherent in a differential amplifier. Thus, amplifier 44 is designed to invert the signal from analog switch 28 and reduce its amplitude in half. The differential amplifier responds to the differential changes in its inputs, i.e. the difference between the output signals from amplifiers 42 and 44 which is twice the value of the output from amplifier 42.

Assuming that a sampled preamble data signal, after amplification by pre-amplifier 24, has an amplitude of 0.8Vpp or 0.4 V peak (0.4Vp). The output from amplifier 42 would be 0.2 V peak and from amplifier 44 would be −0.2Vp. The differential amplifier 32 responds to differential changes in its inputs, i.e., the output of amplifier 32 would be $[0.2\ Vp - (-0.2\ Vp)] \times gain = +0.4\ Vp \times gain$; the gain being determined, in part, by the voltage supplied to the FET's.

Remembering that, in the preferred embodiment, a substantially constant output from amplifier circuit 30 is to be 1 Vpp, how is this done assuming that the actual amplitude of the data (preamble and information) of each segment is less than 1 Vpp (which is the case in the preferred embodiment)?

A difference detector 46 is coupled to the output 32*a* of amplifier circuit 30. As will be more clearly described below with reference to FIG. 2, detector 46 has a built-in reference signal source. This source is designed to always produce a +0.5Vp (1 Vpp) reference signal, i.e. the desired output signal amplitude of all data read from the disc.

Difference detector 46 detects a positive voltage difference between the output 32*a* of amplifier 30 and the +0.5Vp reference signal. In the preferred embodiment, since the actual value of data read from the disc is 1Vpp or less and the initial gain is at its maximum value due to the resetting, by control unit 20, of the gain to maximum at the beginning of the preamble, there will always be a positive difference. The invention as a whole, however, is not confined to operate with only positive differences.

Thus, upon the detection of any difference between the output of amplifier circuit 30 and the reference signal (1 Vpp in the preferred embodiment), a command is sent to a ramp generator 48 to enable it to operate.

Ramp generator 48 functions, when enabled, to send a linearly increasing voltage to FET's 34 and 36 to thereby increase the resistances thereof and thus decrease the effective gain of the amplifier circuit 30. Once the resistance is increased to a value such that the gain of the differential amplifier produces an output equal in amplitude to the reference signal (1 Vpp in the preferred embodiment), the ramp generator 48 is disabled by cessation of the enable command from difference detector 46.

Upon disabling of ramp generator 48, the amount of voltage, supplied to the FET's causing the gain to produce an output signal equal in amplitude to the reference signal, is maintained constant thereby maintaining constant the resistance of the FET's, the effective gain of the amplifier circuit 30, and the output of the latter.

Ramp generator 48 is not enabled solely by the difference detector 46 but requires the additional receipt of an enable command signal from control unit 20. When a preamble is being read by head 12, for example, and is detected by control unit 20 because of the receipt of the corresponding address from head 16, the enable command is sent from control unit 20 to ramp generator 48. However, generator 48 does not supply the increasing voltage to the FET's 34 and 36 until receiving the enable command from detector 46. Conversely, a command solely from detector 46 does not cause the enabling of ramp generator 48 unless and until an enable command is received from control unit 20.

In operation, and with regard to the system shown in FIG. 1, assume that a 1 Vpp is desired from amplifier circuit 30 so that such signal may be effectively digitized by converter 38 (hereinafter described). With this in mind, the built-in reference signal source in detector 46 is set to produce a signal of +0.5Vp.

Further assume that two segments of stored information data are to be serially read from different zones on disc 10 by heads 12 and 14, respectively. The first segment, to be read by head 12, has preamble and information data stored thereon of a value, after pre-amplification, of 0.5 Vpp; and the second segment, to be read by head 14, has a value of 0.8 Vpp. It is desired to have a 1 Vpp (+0.5Vp) output, from amplifier circuit 30, for both.

Assuming the first segment is first read, control unit 20 sends out a command to head selector 22 causing it to select head 12. The preamble of the first segment is read by head 12 and is then pre-amplified by preamplifier 24 which is time-shared between the heads 12 and 14. The presence of the pre-amplified preamble is determined by control unit 20, because of receipt of the corresponding address from head 16, which sends out command signals on line 20*a* and 20*c* respectively resetting peak holder 26 and ramp generator 48, and enabling analog switch 28 on line 20*b* into position contact 28*b*.

The preamble signals pass from the pre-amplifier to peak holder 26 where the peak value thereof is detected and stored. A signal indicative of such peak value (0.25 Vp in the first segment) is then sent through analog switch 28 to amplifiers 42 and 44 where outputs of +0.125 Vp and −0.125 Vp, respectively, are then fed to FET's 34 and 36, respectively.

Because of the characteristic nature of differential amplifier 32, as explained by way of example heretofore, the output from such amplifier will be 0.25 Vp (0.5 Vpp) times the initial gain established, in part, by the FET's. For the purposes of example, assume the gain is initially 13. The output from amplifier 22, therefore, is 3.25 Vp.

This output signal is then fed through an AGC feedback loop containing difference detector 46 and ramp generator 48. Difference detector 46 detects a positive difference of +2.75 Vp between the amplifier output and the reference signal and thus sends an enable command to ramp generator 48 which has already received an enable command on line 20*d* from control unit 20 responsive to the detection, by latter, of the preamble.

Ramp generator 48 then commences sending a linearly increasing voltage to FET's 34 and 36 thereby causing the resistances defined by them to be linearly increased. The effective gain of amplifier circuit 30, therefore, is linearly decreased until the difference between the amplifier output and the reference signal is 0.0 Vp. The amplifier output at 32*a* will then be 0.5 Vp (1Vpp). At this point where a difference is no longer detected by difference detector 46, the enable signal for ramp generator 48 ceases.

Upon disabling of ramp generator 48, its hardware is such as to maintain a constant voltage supplied to the gate of the FET's at a value enabling amplifier 30 to produce a 0.5 Vp (1 Vpp) output. The hardware is fully explained below with reference to FIG. 2.

After the preamble has been read, control unit 20 ceases the enable command on line 20*b* for analog switch 28 and the enable command on line 20*d* for ramp generator 48. Consequently, analog switch 28 switches into position contact 28*a*. Thereafter, information data signals, generally having a preamplified value of 0.25 Vp, pass directly from pre-amplifier 24 to amplifier circuit 30 wherein the gain is maintained constant.

As stated in the background of the invention, a threshold level (T) is established at a value slightly greater than the anticipated noise amplitude and less than the desired information data output (S), i.e. the output from amplifier circuit 30. In the above example, the value of S is always 1 Vpp (0.5 Vp) regardless of the segment of information data read from the disc 10.

Threshold level T is established at the desired value (e.g. 0.4Vpp) by a self-contained voltage reference source in detector/converter 38. Detector/converter 38 is coupled to the output 32*a* of amplifier circuit 30 to receive signals therefrom. Any signals falling below the preset value of T (0.4 Vpp) is discriminated against by detector 38 and thus does not appear at its output. Noise signals mostly fall into this category and are thus discriminated against. Information data, however, is never discriminated against since the AGC circuit insures that the value of S is constant at 1 Vpp (a value higher than the constant value of T). Information data, therefore, regardless of the segment read from, appears at the output of detector/converter 38 in digitized form.

After the information from the first segment has been read and the second segment is to be read by a head 14, the entire procedure, as above described, is repeated with the result that the information data of the second segment, having a value of 0.8 Vpp at the output of pre-amplifier 24, will also have an output of 1 Vpp from amplifier circuit 30 which is non-discriminately passed through detector/converter 38 and manifested at output 38a in digital form.

Figure 2:
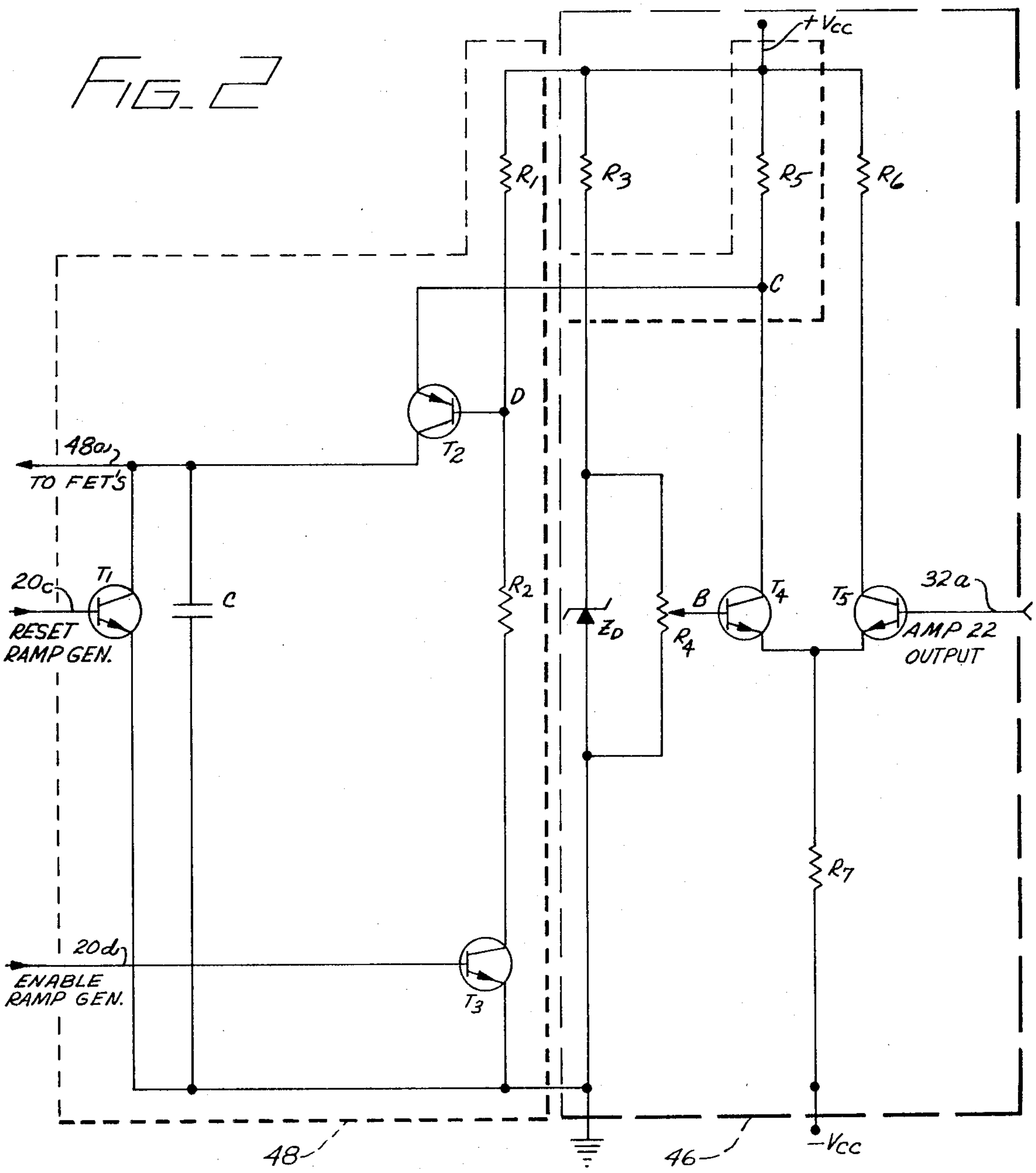
FIG. 2 is a schematic diagram of the ramp generator and threshold detector shown in FIG. 1.

FIG. 2 is a schematic diagram of difference detector 46 and ramp generator 48 of the AGC circuit according to the present invention.

Input 32*a* of difference detector 46 is adapted to receive the output 32*a* from amplifier circuit 30 and consists of the base electrode of a transistor T5. A zener diode $Z_D$ is also included in detector 46 for developing the reference voltage of the desired output of amplifier 30. Voltage developed across the zener diode is also developed across a potentiometer R4 in parallel therewith. A tap on potentiometer R4 is connected to the base electrode (B) of a transistor T4. The reference voltage at B can be set at any desired value between 0.0 V and the maximum voltage developed across $Z_D$. In the preferred embodiment the voltage developed at B is 0.5 Vp.

Detector 46 also includes a resistor R3 coupled between a source of positive supply potential (+Vcc) and the zener diode $Z_D$; a resistor R5 coupled between +Vcc and the output of the detector 38 as represented by point C which is connected to the collector electrode of transistor T4; a resistor R6 coupled between +Vcc and the collector electrode of transistor T5; and a resistor R7 coupling the emitter electrodes of transistors T4 and T5 to a source of negative supply potential (−Vcc).

Whenever a positive difference exists between the signals at 32a and B of the detector, the signal at *32a* turns transistor T5 on thereby cutting off transistor T4 and thus inhibiting the flow of current from +Vcc through R5, T4 and R7 to −Vcc. The lack of current flow through T4 causes the signal at C to rise and is the enabling command of detector 46 to ramp generator 48. The output C of detector 46 is coupled directly to the emitter electrode of a p-n-p transistor T2, of ramp generator 48. The base electrode of transistor T2 is coupled to +Vcc through a resistor R1.

When a preamble is sensed by control unit 20 because of its receipt of the corresponding address from head 16, it sends a positive enable command signal to ramp generator 48 over line *20d* to the base electrode of a transistor T3. Transistor T3 is thereby turned on. Current then flows from +Vcc through R1, R2 and through the transistor T3. The voltage at point D, previously at +Vcc is decreased by the voltage drop across R1. Transistor T2 thereby turns on when detector 46 sends the enabling command to ramp generator 48, as explained above.

Assuming a difference to exist between the signals at *32a* and B, current cannot flow through transistor T4. Since, however, transistor T2 has been turned on by the enable command signal received by transistor T3, current flows from +Vcc through R5 and transistor T2 to a capacitor C.

Capacitor C, initially is shorted by the ramp generator's receipt of a reset command signal during the beginning of the preamble from control unit 20 on line *20c*. This reset signal is applied to the base electrode of a transistor T1 which thereby turns on and discharges the capacitor C completely. The reset signal is a short pulse and quickly disappears so that the capacitor C may begin to recharge by the current flowing through transistor T2.

The current thereby supplied to capacitor C through transistor T2 is a DC current resulting in a steadily increasing voltage developed across the capacitor C. This steadily, and linearly, increasing voltage is supplied directly to the FET's on line *48a*.

When the positive difference between the signals at *32a* and B has been eliminated because of the linearly decreasing gain of amplifier circuit 30 responsive to the voltage supplied by capacitor C on line *48a*, transistor T4 is turned on thereby allowing current to flow through transistor T4 and cutting off the current flow through transistor T2. At the end of the preamble, the enable command on line *20d* from control unit 20 ceases thereby turning off transistors T3 and then T2.

A current path, therefore, is established only between +Vcc and −Vcc by passing through resistor R5, transistor T4 and resistor R7. Current no longer flows through transistor T2 thereby inhibiting the further charging of capacitor C. Capacitor C, however, retains its present charge until a new reset command is received from unit 20 by transistor T1. The result is that when the gain of amplifier circuit 30 is set at a value so that its output equals the reference signal, the ramp generator is sharply disabled by the detector 46 from further increasing the voltage supplied by its capacitor C to the FET's in amplifier circuit 30. Upon disablement, however, the ramp generator, by its capacitor C, maintains the precise voltage supplied to the FET's long enough for the desired information data to be read.

Figure 3:
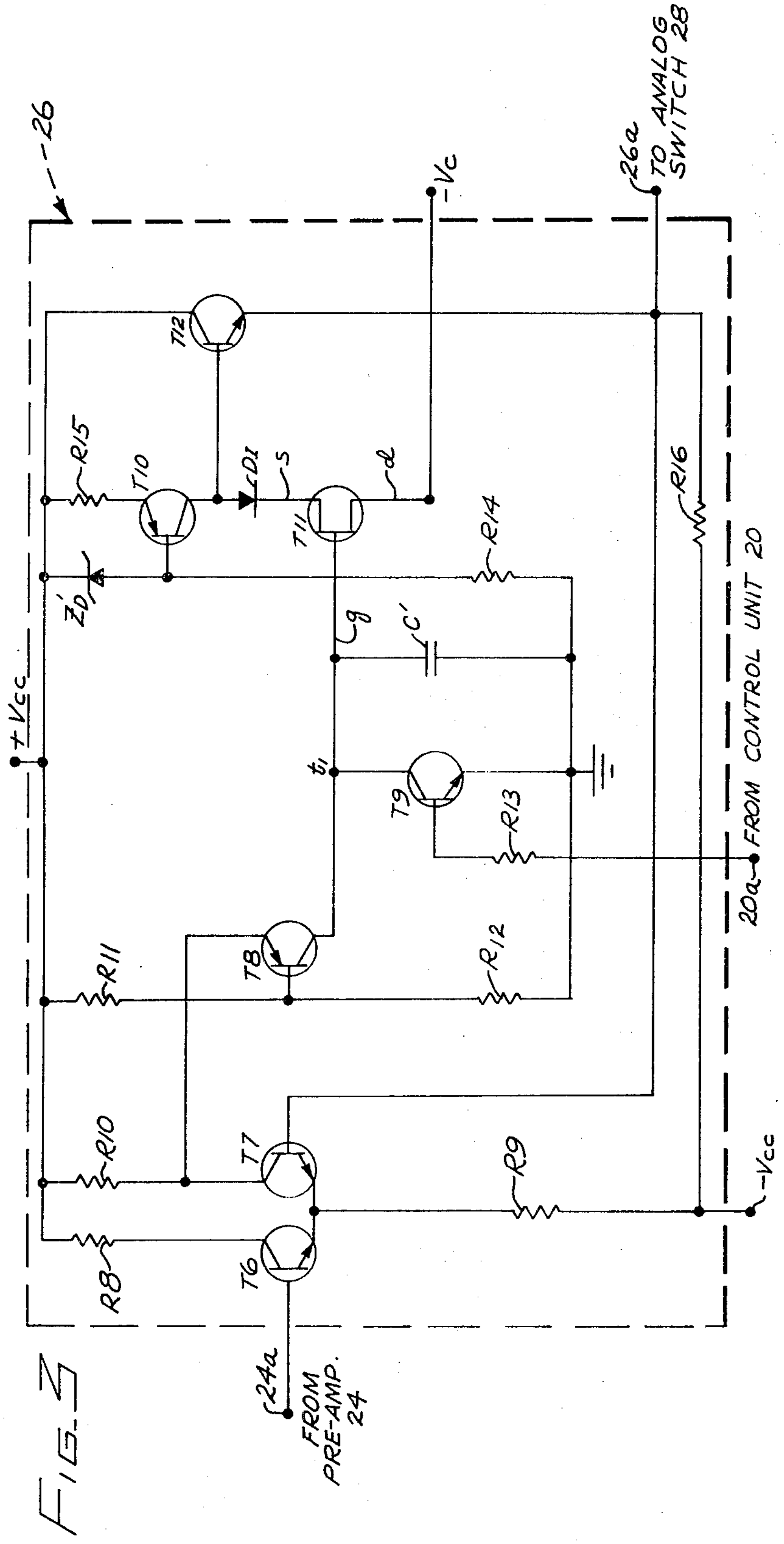
FIG. 3 is a schematic diagram of the peak holder shown in FIG. 1.

FIG. 3 is a schematic diagram of peak holder 26. The output *24a* from pre-amplifier 24 is supplied to the base electrode of a transistor T6, the emitter electrode of which is coupled to the emitter electrode of a transistor T7. Both emitter electrodes are, in turn, coupled to −Vcc through a resistor R9. The collector electrodes of transistors T6 and T7 are coupled to +Vcc through resistors R8 and R10, respectively, Finally, the base electrode of transistor T7 is coupled to analog switch 28 at line *26a*.

A transistor T8 has its base electrode coupled to +Vcc through a resistor R11 and to ground through a resistor R12. Its emitter electrode is coupled to the collector electrode of transistor T7. The collector electrode of transistor T8 is coupled to the collector electrode of a transistor T9, one terminal, t1, of a capacitor C′, and the gate electrode, g, of an FET transistor T11.

Transistor T9 has its emitter electrode coupled to ground as is the other end of capacitor C′. T9, therefore, is coupled across C′ and is the reset transistor therefor. Thus, the base electrode of transistor T9 is coupled to line *20a* through a resistor R13 for receiving the peak holder reset command signal from control unit 20. Upon receipt of such signal, the transistor turns on and discharges capacitor C′.

Field-effect transistor T11 has its drain d, coupled to −Vc and its source s, coupled to the base electrode of a transistor T12 and the collector electrode of a transistor T10 through a diode D1. The base electrode of transistor T10 is coupled to +Vcc through a zener diode $D'_D$ and to ground through a resistor R14. Its emitter electrode is coupled to +Vcc through a resistor R15. The collector electrode of transistor T12 is coupled directly to +Vcc and its emitter electrode is coupled to analog switch 28 via line *26a*. Finally, line *26a* is coupled to −Vcc via a resistor R16.

In operation, upon the sensing of the preamble being read, control unit 20 initiates a reset command along line *20a* which turns on transistor T9 thereby discharging capacitor C′. In this initial condition the input to peak holder 26 at *24a* (Vin) is 0.0 Vp and the output on line *26a* (Vout) is 0.0 Vp. Therefore, the base voltages on transistors T6 and T7 are equal thereby permitting current flow in both of their collectors. A voltage smaller than +Vcc is thereby developed at the emitter electrode of transistor T8 due to the voltage drop across resistors R8 and R10.

The smaller than +Vcc voltage at the emitter electrode of transistor T8 causes the transistor to remain cut off. In other words, no current flows into capacitor C′ and 0.0 Vp is maintained at the gate electrode, g, to FET, T11.

The elements T10, R15, R14, $Z_D'$ and D1 make up a current source which provides the necessary level shifting for T12 to obtain the same voltage level at its emitter electrode as is on capacitor C′.

Assume that an isolated positive pulse (+0.5 Vp) is received at input *24a*. This will cause T7 to cut off and T8 to turn on thereby allowing current to flow from +Vcc through R10, and the collector of T8 and then into capacitor C′. A steady voltage increase at the gate electrode of T11 and at the emitter of T12 is thereby effectuated. This voltage is steadily increased until the voltage at *26a* equals the voltage at *24a*, i.e. Vin = Vout.

When the voltages at *24a* and *26a* are equal, transistor T7 turns on and allows current to flow from +Vcc through R10 and T7 thereby causing a reverse biased condition in transistor T8. Thus, further current flow through transistor T8 to capacitor C′ is inhibited. Capacitor C′ holds the final value corresponding to the voltage at *26a* equal to the voltage at *24a*, i.e., the peak value of the input pulse (+ 0.5 V). the preamble has been read thereby causing control unit 20 to switch analog switch into position *28a* (FIG. 1), transistor T7 will still be on and transistor T8 off thereby maintaining the charge across capacitor C′. Since the emitter electrode of transistor T12 always follows the voltage across capacitor C′, the voltage at *26a* is always equal to the peak value of the input pulse at *24a*.

When a new segment is being read from the disc, control unit 20, sensing the new preamble, causes peak holder 26 to reset by initiating a pulse to transistor T9 thereby turning it on and discharging the capacitor C'. The above cycle is then repeated.

As stated previously, one main advantage of the present invention over prior art systems is the extremely fast time in which the gain of amplifier 30 is set so as to maintain a constant output regardless of high signal variations (13 to 1) at its input. This extremely fast response time, i.e. 500 ns, is facilitated by the fast response time of the peak holder.

Figure 4:
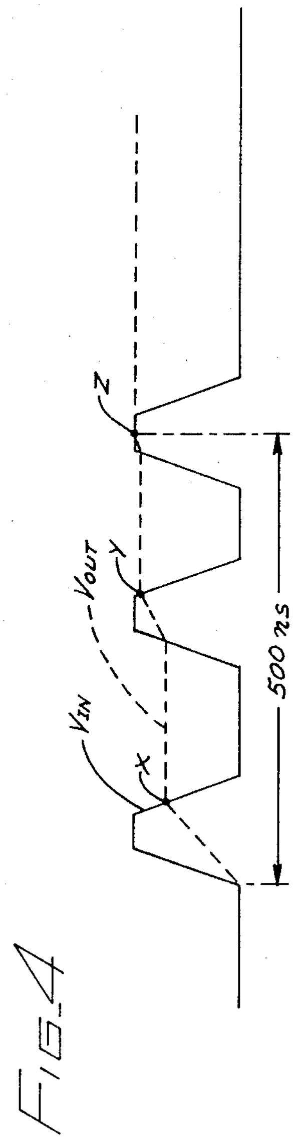
FIG. 4 is a graphical plot of input and output voltages to the peak holder of FIG. 4, as a function of time.

FIG. 4 is a graphical plot of the preamble pulses (Vin) and peak holder output signal (Vout) as a function of time, the plot made in a system having a 13 to 1 signal variation. The time it takes the AGC circuit (FIG. 1) to set the gain of amplifier 30 is directly proportional to the time it takes the peak holder to store the peak value of the preamble.

As soon as control unit 20 receives address data from head 16 (FIG. 1) it knows a preamble is being read from the disc. The reaction time of control unit 20 in resetting peak holder 26 causes the first preamble pulse sampled to be manifested on capacitor C' at a value of only 90 percent of the true peak value. This is shown at point X on the graph.

The next preamble pulse is sampled by peak holder 26 during the time in which the gain of amplifier 30 is being corrected. Therefore, less error in the peak value stored across capacitor C' will result. Point Y on the graph indicates the capacitor charge after the second pulse is sampled. The system effectuates a near 100 percent peak value (point Z) across capacitor C' in very few samples of the preamble. This short time is directly manifest in the extremely short 500 ns in which the AGC circuit effectuates an appropriate gain for amplifier 30.

Figure 5:
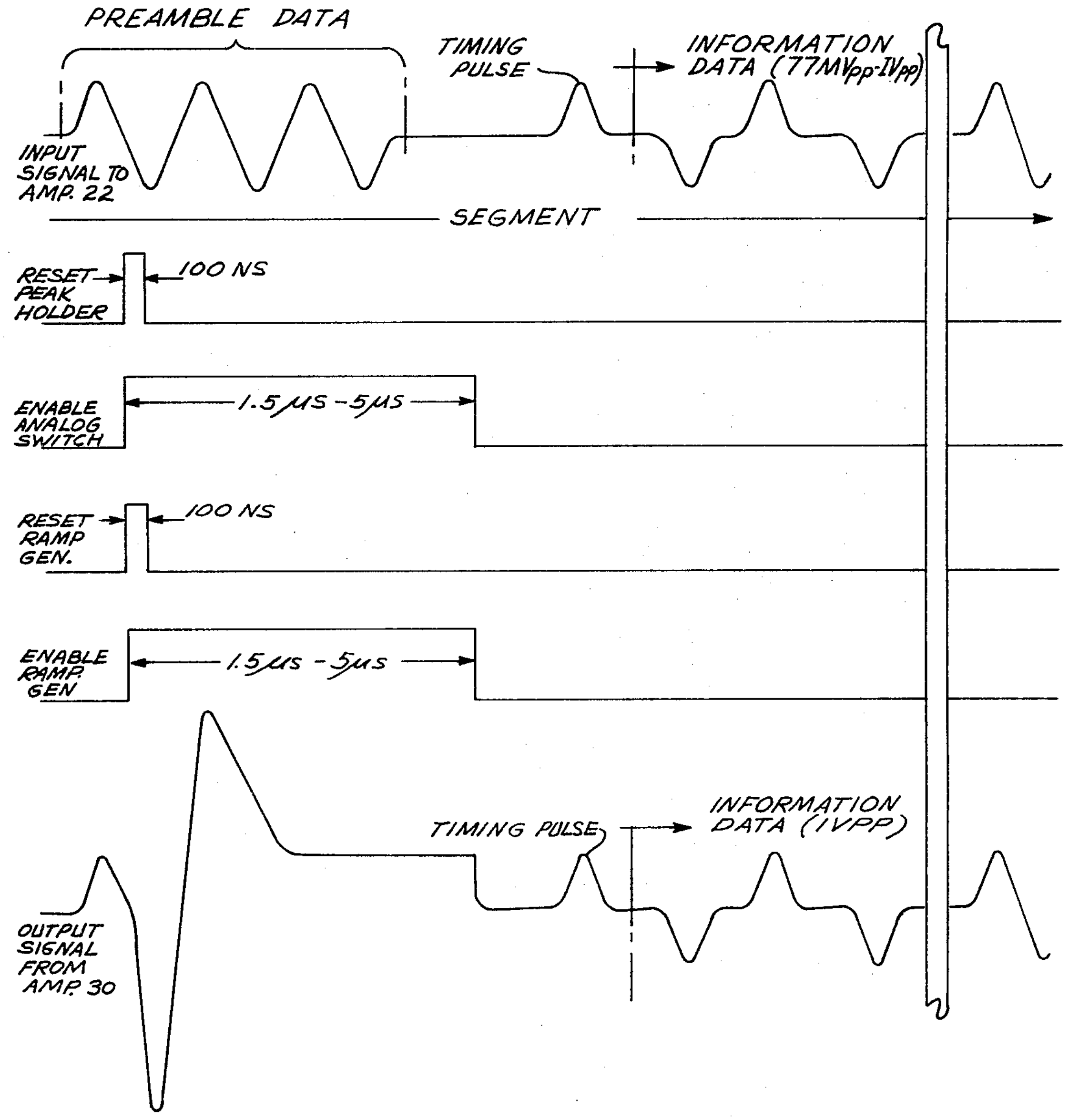
FIG. 5 is a series of graphical representations of certain signals inherent in the operation of the preferred embodiment of the invention.

FIG. 5 shows a series of graphical representations of the other various input and output data signals and the command signals.

The plot of the input signal of amplifier circuit 30 as a function of time displays three types of data stored on each segment, i.e. preamble data, a timing pulse, and information data. The peak to peak voltage of the input to amplifier circuit 30 is variable from 77 mvpp to 1.0 Vpp depending upon the various factors enunciated heretofore (head characteristics, flying-height variations, etc.). However, notice that the amplitude of the preamble data signals is identical with that of the timing pulse for the information data signals and the information data signals themselves. This fact forms the underlying basis for the invention, as has been already stated.

The occurrence of the preamble is sensed by control unit 20 with the latter thereby sending out reset signals on lines 20*a* and 20*c* to the peak holder 26 and ramp generator 48. These signals are shown in FIG. 5 and are only 100 ns in length. Control unit 20 additionally sends out enable signals on lines 20*b* and 20*d* to the analog switch 28 and the ramp generator 48.

These signals are in the order of 1.5 us to 5 us in length and expire after the last preamble data signals have been read. Upon such expiration, the AGC circuit (amplifier circuit 30, difference detector 46, and ramp generator 48) has insured that the output signal from amplifier circuit 30 is 0.5 Vp (1 Vpp) in accordance with the operation previously discussed.

What has been described, therefore, is a method and apparatus for providing constant amplitude readback information data, regardless of the initial amplitude of the information data when read from a moving magnetic recording surface. The preamble to each segment of recorded information is used by the AGC circuit to set the gain of the amplifier circuit in an extremely fast period of time so that its output is always constant regardless of the segment read, and the gain setting is maintained while the corresponding segment of recorded information is being read by disconnecting the AGC circuit.

What is claimed is:

1. In a storage system having a moving magnetic recording surface from which a preamble data signal is read preceding each segment of information data signals, a method for providing constant amplitude readback information data signals comprising the steps of:

a. sampling the amplitude of the preamble data signal preceding each segment of information data signals read from the recording surface;
b. providing a first signal representative of the peak value of the sampled preamble data signal;
c. amplifying the first signal to produce a second signal;
d. providing a reference signal indicative of a desired peak value for information data signals to be read from the surface;
e. comparing the second signal with the reference signal, and providing a third signal indicative of a difference between the second and reference signals;
f. controlling the value of the gain, in the step of amplifying, with the third signal until a predetermined relation is established between the reference and third signals; and
g. maintaining the gain at the established value while amplifying the segment of information data signals preceded by the preamble data signal.

2. The method of claim 1, in which the step of providing a third signal indicative of a difference between the second and reference signals includes generating a ramp signal as the third signal.

3. The method of claim 2, wherein the step of maintaining the gain at the value where the difference disappears includes disabling the ramp signal, responsive to the disappearance of the difference, to thereby maintain the value of the third signal at the level existing upon such disappearance.

4. In a disc file system including a magnetic recording surface, a method for discriminating information data from noise read from the surface, comprising the steps of:

a. amplifying the information data read from the surface to provide an input signal and providing output signals when the input signal exceeds a threshold signal level;
b. sampling the amplitude of preamble data preceding each segment of information data stored on the disc surface;
c. providing a first signal representative of the peak value of the sampled preamble data;
d. amplifying the first signal to produce a second signal;
e. providing a reference signal indicative of a desired peak value for all information data to be read from the surface, such desired peak value being greater than the threshold signal level;
f. comparing the second signal with the reference signal, and providing a third signal indicative of a difference between the second and reference signals;
g. controlling the amplification of the first signal with the third signal until the difference disappears; and
h. amplifying the information data preceded by the preamble data at the value of amplification where the difference disappears, the information data readback from the surface thereby being of a value equal to the reference signal and above the threshold value so that it is not discriminated against as noise.

5. In a storage system having a moving magnetic recording surface from which a preamble data signal is read preceding each segment of information data signals apparatus for providing constant amplitude readback information data signals comprising:

a. first means for sampling the amplitude of a preamble data signal preceding each segment of information data signals read from the recording surface and for producing a first signal proportional to the amplitude thereof;
b. controllable amplifier means for amplifying the first signal to form a second signal and amplifying the information data signals;
c. second means for producing a third signal indicative of a desired peak value for all information data signals to be read from the recording surface;
d. third means for comparing the second and third signals and, during the time a preamble data signal is being amplified; for varying the gain of the controllable amplifier means until a predetermined relation is established between the second and third signals; and e. fourth means for maintaining the gain of the amplifying means at the value where the predetermined relation is established during the time information data signals preceded by the preamble data signal are being read.

6. The apparatus of claim 5, wherein the amplifier means includes controllable variable resistance means for controlling the gain thereof.

7. The apparatus of claim 5, wherein the first means includes a peak holder circuit for receiving the preamble data signal, detecting the peak value thereof, and producing the second signal.

8. The apparatus of claim 7, wherein the preamble data signal comprises a plurality of signal peaks and the peak holder comprises means for integrating the signal peaks.

9. The apparatus of claim 5, including a switching circuit for selectively coupling the preamble data signals through the peak holder circuit to the amplifier means or information data signals directly to the amplifier means.

10. The apparatus of claim 9, wherein a prerecorded signal is provided by the storage system preceding the preamble data signal and further comprising control means responsive to said prerecorded signal for enabling the switching means to couple the preamble data signal through the peak holder circuit to the amplifier means and responsive to the end of said preamble data signal for enabling the switching means to couple the information data signals directly to the amplifier means.

11. The apparatus of claim 5, wherein the third means comprises means for detecting a difference between the second and third signals and for providing an indication of a detected difference therebetween, and a ramp generator responsive to the indications for supplying a signal to the amplifier means thereby controlling the gain of the amplifier means until the difference between the second and third signals is eliminated.

12. The apparatus of claim 11, wherein the amplifier means comprises:

a. a differential amplifier having a pair of inputs;

b. controllable variable resistance means coupled to each of said pair of inputs, the variable resistance means being controlled by the ramp signal; and c. means for applying either the first signal or the information data signals to the pair of inputs including means for inverting the signal to one of the pair of inputs.

13. In a storage system having a moving magnetic recording surface from which a preamble data signal is read preceding information data signals, apparatus for converting the information data signals to digital signals comprising:

a. means for reading said preamble and data signals from the recording surface;

b. means for sensing the read preamble signals and for providing an output signal indicative of the amplitude thereof;

c. controllable amplifier means;

d. means for coupling either the amplitude indicative output signal or the data signals to the amplifier means causing amplification thereof;

e. a ramp signal generator for applying a ramp signal to the amplifier means for controlling the gain of the amplifier means;

f. means for enabling the generator to form the ramp signal whenever the amplitude indicative signal is being amplified until the output signal from the amplifier means reaches a predetermined value; and g. means for disabling the generator to maintain the ramp signal substantially constant after the predetermined value is reached.

14. In a storage system according to claim 13, wherein the means for enabling the generator comprises means for forming a reference signal and means for providing an enabling signal to the ramp generator in response to a difference between the reference signal and the signal from the amplifying means.

15. In a storage system according to claim 13, wherein the generator is operative for generating the ramp signal responsive to the coincidence of a control signal and the enabling of the enabling means, and means for applying a control signal to the generator during the time the amplitude indicative output signal is being amplified.

16. In a storage system according to claim 15, wherein the means for applying a control signal simultaneously applies the control signal to the generator and applies a control signal to the coupling means, the coupling means being responsive to the applied control signal for coupling the amplitude indicative signal to the amplifier means.

* * * * *

PO-1050
(5/69)
6782-LTR

UNITED STATES PATENT OFFICE
CERTIFICATE OF CORRECTION

Patent No. 3,660,821 Dated May 2, 1972

Inventor(s) Gunter R. Weber, Charles E. Bickel & Richard W. Krueger

It is certified that error appears in the above-identified patent and that said Letters Patent are hereby corrected as shown below:

Patent column 3, line 30, the "m" should be deleted.

Patent column 4, line 47, "The amplifiers 42 its 44" should be --The amplifiers 42 and 44--;

line 48, "The reason for i.e. latter" should be --The reason for the latter--.

Patent column 6, line 14, "by latter" should be --by the latter--.

Patent column 8, line 30, "$D'_D$" should be --$Z'_D$--;

line 69, after "(+0.5V)." a new paragraph should start with --When the input pulse at 24a disappears, which occurs when-- then continue with "the preamble has been read . . . ".

Patent column 9, line 38, "signal of amplifier" should be --signal to amplifier--.

Signed and sealed this 27th day of March 1973.

(SEAL)
Attest:

EDWARD M.FLETCHER,JR.
Attesting Officer

ROBERT GOTTSCHALK
Commissioner of Patents